(12) United States Patent
Tran et al.

(10) Patent No.: US 11,120,801 B2
(45) Date of Patent: *Sep. 14, 2021

(54) GENERATING DIALOGUE RESPONSES UTILIZING AN INDEPENDENT CONTEXT-DEPENDENT ADDITIVE RECURRENT NEURAL NETWORK

(71) Applicant: Adobe Inc., San Jose, CA (US)

(72) Inventors: Quan Tran, Melbourne (AU); Trung Bui, San Jose, CA (US); Hung Bui, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,805

(22) Filed: Nov. 2, 2020

(65) Prior Publication Data

US 2021/0050014 A1 Feb. 18, 2021

Related U.S. Application Data

(63) Continuation of application No. 16/133,190, filed on Sep. 17, 2018, now Pat. No. 10,861,456.

(51) Int. Cl.
*G10L 15/22* (2006.01)
*G10L 15/16* (2006.01)
*G06N 3/10* (2006.01)
*G06N 3/04* (2006.01)
*G10L 15/30* (2013.01)

(52) U.S. Cl.
CPC ............ *G10L 15/22* (2013.01); *G06N 3/0481* (2013.01); *G06N 3/10* (2013.01); *G10L 15/16* (2013.01); *G10L 15/30* (2013.01)

(58) Field of Classification Search
CPC ........................................................ G10L 15/22
See application file for complete search history.

(56) References Cited

U.S. PATENT DOCUMENTS

| 7,606,708 B2 * | 10/2009 | Hwang | G10L 15/06 704/257 |
| 2018/0005107 A1 ‡ | 1/2018 | Neil | G06F 15/82 |
| 2018/0329884 A1 * | 11/2018 | Xiong | G06N 3/0445 |

OTHER PUBLICATIONS

Minjoon Seo, Sewon Min, Ali Farhadi, and Hannaneh Hajishirzi. 2017. Query-regression networks for machine comprehension. In ICLR.‡

(Continued)

*Primary Examiner* — Ibrahim Siddo
(74) *Attorney, Agent, or Firm* — Keller Jolley Preece

(57) ABSTRACT

The present disclosure relates to systems, methods, and non-transitory computer readable media for generating dialogue responses based on received utterances utilizing an independent gate context-dependent additive recurrent neural network. For example, the disclosed systems can utilize a neural network model to generate a dialogue history vector based on received utterances and can use the dialogue history vector to generate a dialogue response. The independent gate context-dependent additive recurrent neural network can remove local context to reduce computation complexity and allow for gates at all time steps to be computed in parallel. The independent gate context-dependent additive recurrent neural network maintains the sequential nature of a recurrent neural network using the hidden vector output.

20 Claims, 10 Drawing Sheets

(56) References Cited

OTHER PUBLICATIONS

Gehui Shen, Yunlun Yang, and Zhi-Hong Deng. 2017. Inter-weighted alignment network for sentence pair modeling. In Proceedings of the 2017 Conference on Empirical Methods in Natural Language Processing. pp. 1190-1200.‡
Sainbayar Sukhbaatar, Jason Weston, Rob Fergus, et al. 2015. End-to-end memory networks. In Advances in neural information processing systems. pp. 2440-2448.‡
Yi Tay, Anh Tuan Luu, and Siu Cheung Hui. 2017. Enabling efficient question answer retrieval via hyperbolic neural networks. CoRR abs/1707.07847.‡
Tomas Mikolov, Ilya Sutskever, Kai Chen, Greg S Corrado, and Jeff Dean. 2013. Distributed representa-tions of words and phrases and their compositional-ity. In Advances in neural information processing systems. pp. 3111-3119.‡
Jinfeng Rao, Hua He, and Jimmy Lin. 2016. Noise-contrastive estimation for answer selection with deep neural networks. In Proceedings of the 25th ACM International on Conference on Information and Knowledge Management. ACM, pp. 1913-1916.‡
Fei Liu and Julien Perez. 2017. Gated end-to-end memory networks. In Proceedings of the 15th Conference of the European Chapter of the Association for Computational Linguistics: vol. 1, Long Papers. Association for Computational Linguistics, Valencia, Spain, pp. 1-10.‡
Mitchell P Marcus, Mary Ann Marcinkiewicz, and Beatrice Santorini. 1993. Building a large annotated corpus of english: The penn treebank. Computational linguistics 19(2):313-330.‡
Jason D Williams, Kavosh Asadi, and Geoffrey Zweig. 2017. Hybrid code networks: practical and efficient end-to-end dialog control with supervised and reinforcement learning. In Proceedings of the 55th Annual Meeting of the Association for Computational Linguistics (vol. 1: Long Papers). Association for Computational Linguistics, Vancouver, Canada, pp. 665-677.‡
Henderson, M. a. (2014). The Second Dialog State Tracking Challenge. Proceedings of the 15th Annual Meeting of the Special Interest Group on Discourse and Dialogue (SIGDIAL).‡
Hochreiter, S. a. (1997). Long short-term memory (vol. 9). Neural computation.‡
Stolcke, A. a. (2002). SRILM—an extensible language modeling toolkit. Interspeech.‡
Mengqiu Wang, Noah A Smith, and Teruko Mitamura. 2007. What is the jeopardy model? a quasi-synchronous grammar for qa. In EMNLP-CoNLL. vol. 7, pp. 22-32.‡
Zhiguo Wang, Wael Hamza, and Radu Florian. 2017. Bilateral multi-perspective matching for natural language sentences. arXiv preprint arXiv:1702.03814.‡
Quan Tran, Andrew MacKinlay, and Antonio Jimeno Yepes. 2017. Named entity recognition with stack residual lstm and trainable bias decoding. In Proceedings of the Eighth International Joint Conference on Natural Language Processing (vol. 1: Long Papers). vol. 1, pp. 566-575.‡
Quan Hung Tran, Ingrid Zukerman, and Gholamreza Haffari. 2016. Inter-document contextual language model. In Proceedings of the 2016 Conference of the North American Chapter of the Association for Computational Linguistics: Human Language Technologies. Association for Computational Linguistics, San Diego, California, pp. 762-766.‡
Yangfeng Ji, Trevor Cohn, Lingpeng Kong, Chris Dyer, and Jacob Eisenstein. 2016a. Document context language models. In ICLR (Workshop track).‡
Kaiming He, Xiangyu Zhang, Shaoqing Ren, and Jian Sun. 2016. Deep residual learning for image recognition. In Proceedings of the IEEE conference on computer vision and pattern recognition. pp. 770-778.‡
Sepp Hochreiter and Jurgen Schmidhuber. 1997. Long short-term memory. Neural computation 9(8): 1735-1780.‡
Kenton Lee, Omer Levy, and Luke Zetllemoyer. 2017. Recurrent additive networks. arXiv preprint arXiv:1705.07393.‡

Bing Liu and Ian Lane. 2017. An end-to-end trainable neural network model with belief tracking for task-oriented dialog. In Interspeech 2017.‡
The North American Chapter of the Association for Computational Linguistics: Human Language Technologies. Association for Computational Linguistics San Diego, California, pp. 332-342‡
Jey Han Lau, Timothy Baldwin, and Trevor Cohn. 2017. Topically driven neural language model. In Proceedings of the 55th Annual Meeting of the Association for Computational Linguistics (vol. 1:Long Papers). Association for Computational Linguistics, pp. 355-365.‡
Weijie Bian, Si Li, Zhao Yang, Guang Chen, and Zhiqing Lin. 2017. A compare-aggregate model with dynamic-clip attention for answer selection. In Proceedings of the 2017 ACM on Conference on Information and Knowledge Management, CIKM 2017, Singapore, Nov. 6-10, 2017. pp. 1987-1990.‡
Antoine Bordes and Jason Weston. 2017. Learning end-to-end goal-oriented dialog. In ICLR 2017.‡
Junyoung Chung, Caglar Gulcehre, KyungHyun Cho, and Yoshua Bengio. 2014. Empirical evaluation of gated recurrent neural networks on sequence modeling. arXiv preprint arXiv: 1412.3555.‡
Hua He, Kevin Gimpel, and Jimmy J Lin. 2015. Multi-perspective sentence similarity modeling with convolutional neural networks. In EMNLP. pp. 1576-1586.‡
Layla El Asri, Hannes Schulz, Shikhar Sharma, Jeremie Zumer, Justin Harris, Emery Fine, Rahul Mehrotra, and Kaheer Suleman. 2017. Frames: A corpus for adding memory to goal-oriented dialogue systems. arXiv preprint arXiv:1704.00057.‡
Dzmitry Bahdanau, Kyunghyun Cho, and Yoshua Bengio. 2015. Neural machine translation by jointly learning to align and translate. In ICLR.‡
Martin Abadi, Ashish Agarwal, Paul Barham, Eugene Brevdo, Zhifeng Chen, Craig Citro, Greg S. Corrado, Andy Davis, Jeffrey Dean, Matthieu Devin, Sanjay Ghemawat, Ian Goodfellow, Andrew Harp, Geoffrey Irving, Michael Isard, Yangqing Jia, Rafal Jozefowicz, Lukasz Kaiser, Manjunath Kudlur, Josh Levenberg, Dan Mane, Rajat Monga, Sherry Moore, Derek Murray, Chris Olah, Mike Schuster, Jonathon Shlens, Benoit Steiner, Ilya Sutskever, Kunal Talwar, Paul Tucker, Vincent Vanhoucke, Vijay Vasudevan, Fernanda Viegas, Oriol Vinyals, Pete Warden, Martin Wattenberg, Martin Wicke, Yuan Yu, and Xiaoqiang Zheng. 2015. TensorFlow: Large-scale machine learning on heterogeneous systems. Software available from tensorflow.org.‡
Dzmitry Bandanau, Kyunghyun Cho, and Yoshua Bengio. 2015. Neural machine translation by jointly learning to align and translate. In ICLR.
Yangfeng Ji, Gholamreza Haffari, and Jacob Eisen-stein. 2016b. A latent variable recurrent neural network for discourse-driven language models. In Proceedings of the 2016 Conference of the North American Chapter of the Association for Computational Linguistics: Human Language Technologies. Association for Computational Linguistics, San Diego, California, pp. 332-342.
Kenton Lee, Omer Levy, and Luke Zettlemoyer. 2017. Recurrent additive networks. arXiv preprint arXiv:1705.07393.
U.S. Appl. No. 16/133,190, Jul. 14, 2020, Office Action.
U.S. Appl. No. 16/133,190, Sep. 9, 2020, Notice of Allowance.
Weijie Bian, Si Li, Zhao Yang, Guang Chen, and Zhiqing Lin. 2017. A compare-aggregate model with dynamic-clip attention for answer selection. In Proceedings of the 2017 ACM on Conference Information and Knowledge Management, CIKM 2017, Singapore, Nov. 6-10, 2017. pp. 1987-1990.
Hua He, Kevin Gimpel, and Jimmy J Lin. 2015. Multi-perspective sentence similarity modeling convolutional neural networks. In EMNLP. pp. 1576-1586.
Yangfeng Ji, Gholamreza Haffari, and Jacob Eisen-stein. 2016b. A latent variable recurrent neural network for discourse-driven language models. In Proceedings of the 2016 Conference of the American Chapter of the Association for Computational Linguistics: Human Language Technologies. Association for Computational Linguistics, San Diego, California, pp. 332-342.
Quan Tran, Andrew MacKinlay, and Antonio Jimeno Yepes. 2017. Named entity recognition with stack residual lstm and trainable bias

(56) References Cited

OTHER PUBLICATIONS decoding. In Proceedings of the Eighth International Joint Conference on Natural Language Processing (vol. 1: Long Papers). vol. 1, pp. 566-575.

* cited by examiner
‡ imported from a related application

| Systems | Dialogue Accuracy on Babi Task 6 | Dialogue Accuracy on Frame dataset |
|---|---|---|
| iCARNN | 50.2% | 28.4% |
| Query Reduction Network (Seo, 2016) | 47.9% | 25.5% |
| Gated Memory Network (Perez, 2016) | 47.4% | 23.6% |
| Memory Network (Sukhbaatar, 2015) | 41.1% | — |

GENERATING DIALOGUE RESPONSES UTILIZING AN INDEPENDENT CONTEXT-DEPENDENT ADDITIVE RECURRENT NEURAL NETWORK

CROSS-REFERENCE TO RELATED APPLICATIONS

The present application is a continuation of U.S. application Ser. No. 16/133,190, filed on Sep. 17, 2018. The aforementioned application is hereby incorporated by reference in its entirety.

BACKGROUND

Advancements in software and hardware platforms have led to a variety of improvements in systems for artificial agents that can conduct dialogue with users. For example, digital dialogue systems are now able to have rudimentary conversations with users by answering questions or responding to basic verbal interactions. Amid efforts to improve the flow of conversation and the quality of dialogue, conventional digital dialogue systems have been developed that can utilize rule-based or feature-based dialogue generation techniques.

Despite these advances however, conventional digital dialogue systems continue to suffer from a number of disadvantages, particularly in their accuracy, efficiency, and flexibility. For example, although many conventional digital dialogue systems can utilize learned features to generate dialogue responses, these systems nevertheless produce inaccurate results due to a heavy reliance on domain-specific rules and feature engineering. Many systems that rely on feature engineering in specific domains ignore the contextual and sequential nature of conversations, and therefore, generate digital responses to verbal cues that seem out of place or unnatural.

In addition, conventional digital dialogue systems are also inefficient. Indeed, rule-based and feature-based systems require a significant amount of processing power, time, storage, and other computer resources to process and analyze verbal cues to generate and store rules and/or features. Because many conventional systems are domain-specific, some circumstance require many variations of a single system to account for various types of conversations (e.g., food-related conversation, technology-related conversation, sports-related conversation), which requires large amounts of computer storage and processing power. Additionally, storing features associated with each domain requires a significant amount of computer resources and further slows the system by requiring additional training.

Moreover, conventional digital dialogue systems suffer from domain-adaptation flexibility problems. For example, due to the fact many conventional digital dialogue systems are domain-specific, these systems are not suited for adaptation in other domains besides the one for which they are specifically designed. Indeed, a system trained specifically to generate digital dialogue about sports is not well-suited to interact with a user attempting to converse about a different subject such as history, geography, or places to eat. Still further, conventional digital dialogue systems often suffer from the flexibility problem in that they cannot recover from situations/dialogue they are not designed to handle. In other words, when asked a question the system is not designed to handle, the system fails (e.g., the system either cannot answer or provides a wrong answer).

Current state of the art dialogue systems typically either treat the dialog problem as a machine reading problem or use pure sequential mapping formulations. Treating the dialog problem as a machine reading problem, while suited for answering questions, suffers in the dialog context as it ignores the sequential nature of conversations. On the other hand, purely sequential mapping formulations can fail to produce a coherent conversation when topics change quickly or topics of the dialogue bounce back and forth. In particular, purely sequential mapping formulations constantly update the sequence that is provided as input, which leads to the forgetting of previous context that informs current dialogue. For example, in the case of a dialogue about food that switches to directions for a particular restaurant, when the dialogue switches back to food, the purely sequential mapping formulation can have forgotten the context of food and instead still be focused on directions leading to errors or a non-coherent conversation.

Thus, there are several disadvantages with regard to conventional digital dialogue systems.

SUMMARY

One or more embodiments described herein provide benefits and solve one or more of the foregoing or other problems in the art with systems, methods, and non-transitory computer readable media that generate end-to-end dialogue by formalizing the dialogue problem as a context-dependent sequence mapping problem. In particular, the disclosed systems use two sources of signals, a controlling context signal (e.g., the previous utterance) and a history signal (e.g., the dialog history). More specifically, the disclosed systems can utilize an independent gate context-dependent additive recurrent neural network that does not rely on domain-specific rules or feature engineering, and thus, is applicable in a variety of domains and that further enjoys fast, efficient operation. Indeed, the disclosed systems generate word-embeddings of the words in the utterances received from a user. Based on the word-embeddings, the disclosed systems can generate vector representations for received utterances. In addition, based on global contextual information associated with the utterances, the disclosed systems utilize an independent gate context-dependent additive recurrent neural network to generate a dialogue history vector to use as a basis for generating a dialogue response corresponding to the one or more utterances.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
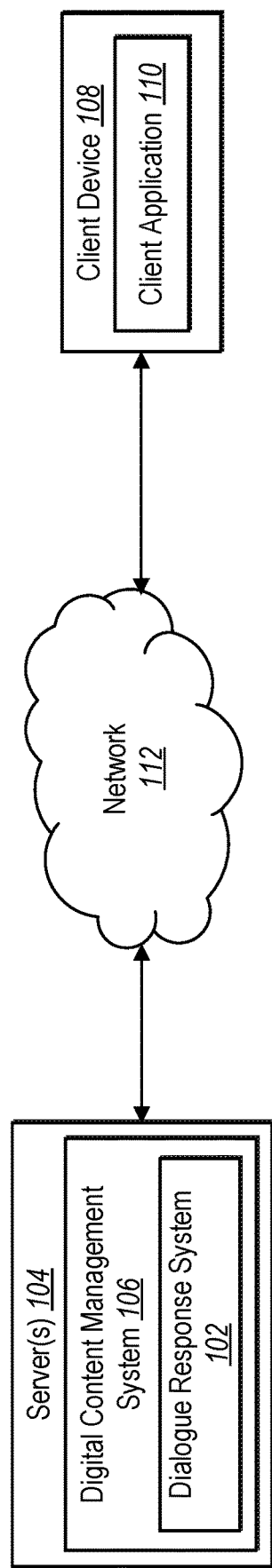
FIG. 1 illustrates an example environment for implementing a dialogue response system in accordance with one or more embodiments.

One or more embodiments described herein provide benefits and solve one or more of the foregoing or other problems in the art with a dialogue response system that utilizes machine learning models (e.g., neural networks) to generate end-to-end dialogue responses corresponding to received verbal prompts. For example, the dialogue response system can generate digital dialogue responses (e.g., as playable audio and/or text) based on vector representations of utterances. The dialogue response system utilizes a particular neural network framework—an independent gate context-dependent additive recurrent neural network—to generate dialogue responses where the network does not rely on domain-specific rules or feature engineering to perform dialogue. In addition, the dialogue response system considers global contextual information and sequential information associated with a dialogue history to generate natural, accurate dialogue responses.

To generate dialogue responses, the dialogue response system generates representations for one or more utterances (e.g., sequences of words) received from a user. In addition, the dialogue response system determines global contextual information associated with the one or more utterances. The dialogue response system can further generate a dialogue history vector for the one or more utterances by utilizing an independent gate context-dependent additive recurrent neural network ("iCARNN"). Furthermore, the dialogue response system can generate a dialogue response based on the generated dialogue history vector and the vector representations.

As mentioned, the dialogue response system can generate representations for one or more utterances received from a user. In particular, the dialogue response system can receive one or more utterances from a user (or more than one user) via a digital audio recording device. The dialogue response system can further utilize a position encoder model to encode each utterance based on position—e.g., the position of words within each utterance and/or the position of each utterance relative to the conversation as a whole (e.g., other utterances). Based on encoding, the dialogue response system can generate vector representations of the one or more utterances. Indeed, the dialogue response system can generate real vectors for each utterance, where every word in a given utterance is represented by a respective word embedding.

The dialogue response system can further determine contextual information associated with the one or more utterances. Particularly, the dialogue response system can utilize a context signal as an input for a neural network model. For example, the dialogue response system can determine contextual information, such as a current or previous utterance, to use as a context signal for implementing the neural network model to generate a dialogue response.

In addition, the dialogue response system can generate a dialogue history vector. Indeed, the dialogue response system can generate a dialogue history vector based on contextual information as well as the vector representations of the utterances. To generate a dialogue history vector, the dialogue response system can utilize a neural network model (e.g., an iCARNN) to generate, for each word in a given sentence, or for each utterance in a sequence of utterances, a hidden vector output. In some embodiments, the dialogue response system can utilize a separate instance of the neural network model for each word or utterance to generate independent hidden vector outputs. Based on the hidden vector outputs associated with the words/utterances, the dialogue response system can generate a dialogue history vector. For instance, the dialogue response system can generate the dialogue history vector from embeddings (e.g., hidden vector representations) a sequence of words/utterances.

As mentioned, the dialogue response system can utilize an iCARNN to generate hidden vector outputs associated with each word in a sentence or each utterance in a sequence of utterances. Indeed, the iCARNN is a new neural network architecture that can consider two different inputs or signals: 1) a text input (e.g., a dialogue history) and 2) a context signal (e.g., sequence information associated with a given utterance). In addition, the iCARNN can include two separate, independent gates. Indeed, the gates of the iCARNN can be independent such that the output of the first gate does not depend on the output of the second gate and the output of the second gate likewise does not depend on the output of the first gate. One gate of the iCARNN can be used for restricting input, and the other gate can be used for restricting flow through the network. The gates for different inputs in different timesteps are also independent, thus, all the gates for any given length input can be computed in parallel, which greatly improves training performance.

Additionally, the iCARNN minimizes the use of non-linearity to facilitate the ease of gradient flow while also utilizing a minimal number of parameters. Indeed, without considering the gating non-linearity, the information flow from any point in the input sequence to any point of the hidden sequence is strictly linear. Accordingly, the hidden unit outputs of this particular neural network model can be decomposed into weighted sums of inputs. The non-linearity at the gates is introduced because it assists numerical magnitude control, i.e. restricting values of the gate vectors to be between 0 and 1 so that the gates have the desired effects (e.g., to discard or pass the information through).

In addition, by utilizing the iCARNN, the dialogue response system can generate a first hidden vector output at a first-time step, a second hidden vector output at a second time step, etc., until the final word in the sentence or utterance in the sequence. Thus, the dialogue response system utilizes the iCARNN to generate a sequence of hidden vector outputs. Based on the hidden vector outputs, the dialogue response system generates a dialogue history vector that represents an entire (or partial) dialogue history between the dialogue response system and one or more users.

As further mentioned, the dialogue response system can generate a dialogue response corresponding to the one or more received utterances. Indeed, the dialogue response system generates a digital dialogue response that is playable and/or viewable by a user at a client device. The dialogue response system intelligently generates a dialogue response that is natural and that flows within the overall conversation of the previous dialogue history. For example, the dialogue response system can utilize or call an application programming interface ("API") that, based on the dialogue history vector, returns audio and/or text for delivery to a client device.

The dialogue response system provides several advantages over conventional systems. For example, the dialogue response system can improve accuracy in generating dialogue responses. To illustrate, the dialogue response system can consider global contextual information in generating dialogue responses. Accordingly, the dialogue response system can generate dialogue responses that more accurately and naturally match a dialogue conversation with a user. Indeed, dialogue is generally a sequence of utterances, and because the dialogue response system utilizes context parameters that account for global dialogue sequences in this sense, the dialogue response system is more accurate than conventional systems that generally ignore the contextual and sequential nature of conversations.

The dialogue response system further improves efficiency over conventional systems. To illustrate, the dialogue response system can increase the speed of training a neural network model (e.g., the iCARNN). For instance, the dialogue response system simplifies the training process as compared to conventional systems because the dialogue response system utilizes a neural network model that does not require manual training features. Thus, the dialogue response system further requires less storage and processing power, not only in training the neural network model, but also in its application. For example, the dialogue response system ignores local contextual information (e.g., by removing the previous hidden state of the iCARNN) to reduce computation costs and to further increase computation speed. In particular, by not taking into account the previous hidden vector, the dialogue response system can generate all gate outputs in parallel. The dialogue response system further requires no feature extraction for generating dialogue responses, thereby reducing computation costs as compared to conventional systems. In addition, the dialogue response system provides longer information dependency than conventional systems.

The dialogue response system also improves flexibility over conventional systems. For example, as a result of not relying on domain-specific rules or feature engineering, the dialogue response system is adaptable to many different domains, topics, and/or dialogue types. Indeed, the dialogue response system is not limited by its training on particular subjects and is more universal in its application. Thus, the dialogue response system is more flexible than conventional digital dialogue systems that are limited by domain-specific rules or that are trained based on limited training data. More specifically, the dialogue response system can adapt to and response to dialogue, even when such dialogue and situations were not used as part of the training of the dialogue response system.

As illustrated by the foregoing discussion, the present disclosure utilizes a variety of terms to describe features and benefits of the dialogue response system. As mentioned, the dialogue response system can utilize a neural network to generate digital responses. As used herein, the term "neural network" refers to an artificial machine-learning model that learns tasks by analyzing example data utilizing a plurality of layers that analyze features of the example data at different levels of abstraction. In particular, the term neural network can include a model of interconnected digital neurons that communicate and learn to approximate complex functions and generate outputs based on a plurality of inputs provided to the model. A neural network can include a variety of deep learning models, including convolutional neural networks, recurrent neural networks (e.g., with long short-term memory architecture), deep neural networks, or deep stacking networks. Neural networks such as recurrent neural networks can model complex non-linear relationships by generating hidden vector outputs along a sequence of inputs. To illustrate, in one or more embodiments the dialogue response system utilizes a new architecture of neural network referred to as an independent gate context-dependent additive recurrent neural network or "iCARNN." Additional detail regarding the iCARNN and its architecture is provided below with reference to the figures.

As mentioned, the dialogue response system generates dialogues responses based on one or more utterances received from a user. As used herein, the term "utterance" refers to a sequence of words. Particularly, an utterance can refer to one or more words spoken by a user. For example, an utterance can include one or more words that form one or more sentences in the form of statements and/or questions. An utterance can also, or alternatively, refer to one or more words that do not form a sentence, but instead form a sentence fragment, a description of a particular object, and/or a reply to a question. Indeed, an utterance can refer to one or more words combined in a sequential nature.

As just mentioned, the dialogue response system can receive one or more utterances to use as a basis for generating a response using a context-dependent additive recurrent neural network. In some embodiments, a context-dependent additive recurrent neural network can alternatively receive units other than utterances as input for generating a response or prediction. As used herein, the term "unit" refers to a data object for which the context-dependent additive recurrent neural network can gather information and can perform the various methods and techniques disclosed herein. For example, a unit can include a word, a sequence of words, or an utterance. A unit can also or alternatively include an individual data about a user (e.g., a sequence of actions), a customer (a sequence of web browsing or search history), a patient (a sequence of treatments), etc. A unit can further include a data about a non-person object such as a car (a sequence of maintenance), a house, a type of medicine, a government program, a school district, a population, a business, or some other object for which the context-dependent additive recurrent neural network can gather information and generate a prediction.

As also mentioned, the dialogue response system utilizes a position encoder model to generate vector representations of a sequence of utterances. As used herein, a "vector representation" refers to an expression or representation of a word or utterance in vector space. Particularly, a vector representation of an utterance can refer to a representation in vector space that indicates information associated with the utterance. Indeed, in some embodiments, the dialogue response system utilizes the position encoder model to compose a representation from a randomly initialized word vector representation. These word vector representations are often jointly optimized with the model. In other embodiments, the dialogue response system utilizes a "vector representation model" such as Word2Vec, GloVe, or another vector representation model to generate vector representations of words. To illustrate, the dialogue response system can utilize the word to vector algorithm, "Word2vec" as described in Mikolov, Tomas; Sutskever, Ilya; Chen, Kai; Corrado, Greg S.; Dean, Jeff, Distributed representations of words and phrases and their compositionality, NIPS 2013, the entire contents of which are hereby incorporated by reference.

As mentioned, the dialogue response system determines global contextual information associated with one or more utterances. As used herein, the term "global contextual information" (or sometimes simply "contextual information") refers to information associated with dialogue context. In particular, contextual information can refer to a context signal that indicates an order, flow, or sequence of a conversation. For example, contextual information can include a previous utterance in a dialogue history, discourse information related to a dialogue, or a question posed to the dialogue response system. The dialogue response system can utilize contextual information as a neural network input to generate dialogue responses that maintain natural conversation flow.

As mentioned, the dialogue response system generates dialogue responses based on dialogue history. Indeed, the dialogue response system generates a dialogue history vector as part of generating a dialogue response. As used herein, the term "dialogue history vector" refers to a vector that indicates a dialogue history. Particularly, a dialogue history vector can indicate or represent one or more utterances of a dialogue or conversation. For example, a dialogue history vector can include or be composed of a combination of hidden vector outputs generated by a neural network, where each hidden vector output corresponds to a given input utterance of a dialogue.

In addition, the term "dialogue response" refers to a response that the dialogue response system generates to provide to a user and/or client device. In particular, a dialogue response can refer to digital text or digital audio that answers a question posed by a user or that is otherwise responsive to an utterance provided by a user. For example, a dialogue response can refer to a viewable or playable sequence of digitally-created words that, based on the dialogue history of a particular conversation that a user is carrying with the dialogue response system, continues the conversation in a natural manner.

In some embodiments, the dialogue response system trains one or more neural networks to generate dialogue responses based on dialogue history. As used herein, the term "train" refers to utilizing information to tune or teach a neural network or other model. The term "training" (used as an adjective or descriptor, such as "training digital frames" or "training digital video") refers to information or data utilized to tune or teach the model.

Additional detail regarding the dialogue response system will now be provided with reference to the figures. For example, FIG. 1 illustrates a schematic diagram of an example environment for implementing a dialogue response system 102 in accordance with one or more embodiments. An overview of the dialogue response system 102 is described in relation to FIG. 1. Thereafter, a more detailed description of the components and processes of the dialogue response system 102 is provided in relation to the subsequent figures.

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 10.

Additionally, the environment includes a client device 108. The client device 108 can be one of a variety of computing devices, including a smartphone, tablet, smart television, desktop computer, laptop computer, virtual reality device, augmented reality device, or other computing device as described in relation to FIG. 10. Although FIG. 1 illustrates a single client device 108, in some embodiments the environment can include multiple different user client devices, each associated with a different user. The client device 108 can be capable of recording and/or transmitting utterances (e.g., in the form of digital audio) to the server(s) 104. Thus, the dialogue response system 102 can receive utterances from more than one user and can generate dialogue responses accordingly. Additionally, the client device 108 can be capable of displaying and/or audibly playing a dialogue response received from the server(s) 104 for presentation to a user.

As illustrated in FIG. 1, the environment includes the server(s) 104. The server(s) 104 may generate, store, receive, and transmit electronic data, such as digital text, digital video, digital images, digital audio, metadata, etc. For example, the server(s) 104 may receive data from the client device 108 in the form of an utterance (e.g., digital audio). In addition, the server(s) 104 can transmit data to the client device 108 to provide a dialogue response. For example, the server(s) 104 can communicate with the client device 108 to transmit and/or receive data via the network 112. In some embodiments, the server(s) 104 comprises a content server. The server(s) 104 can also comprise an application server, a communication server, a web-hosting server, a social networking server, or a digital content campaign server.

As shown in FIG. 1, the server(s) 104 can also include the dialogue response system 102 as part of a digital content management system 106. The digital content management system 106 can communicate with the client device 108 to provide digital content such as digital text, digital audio, digital video, digital images, or some other type of information. Indeed, the digital content management system 106 can refer to a digital agent system, digital content campaign system (e.g., a system for selecting and providing customized digital videos to client devices simultaneously accessing websites or other digital assets) and/or a system for facilitating dialogue between the dialogue response system 102 and one or more users.

Although FIG. 1 depicts the dialogue response system 102 located on the server(s) 104, in some embodiments, the dialogue response system 102 may be implemented by (e.g., located entirely or in part) on one or more other components of the environment. For example, the dialogue response system 102 may be implemented by the client device 108 and/or a third-party device.

Indeed, in or more embodiments, the dialogue response system 102 is implemented on a third-party server. For example, in such embodiments, the server(s) 104 may be associated with a business such as a restaurant chain, a department store, a digital content publisher, etc., and a third-party server can host the dialogue response system 102. Specifically, the third-party server can receive information regarding a user, provide identification information for the user from the third-party server to the digital content publisher by way of the server(s) 104, and the server(s) 104 can select and provide digital content for display to a client device (e.g., the client device 108) of a user.

As illustrated in FIG. 1, the client device 108 includes a client application 110. The client application 110 may be a web application or a native application installed on the client device 108 (e.g., a mobile application, a desktop application, etc.). The client application 110 can interface with the dialogue response system 102 to receive digital content such as digital text, digital audio, and/or digital video from the server(s) 104, and to present (e.g., display) the digital content received from the server(s) 104. In addition, the client application 110 can collect and provide information associated with a user to the dialogue response system 102. For instance, the client application 110 can provide information relating to utterances received from a user. Thus, the dialogue response system 102 can provide dialogue responses to particular utterances from a user.

In some embodiments, though not illustrated in FIG. 1, the environment may have a different arrangement of components and/or may have a different number or set of components altogether. For example, the client device 108 may communicate directly with the dialogue response system 102, bypassing the network 112. Additionally, the dialogue response system 102 can include one or more databases (e.g., a digital content database) housed on the server(s) 104 or elsewhere in the environment. Further, the dialogue response system 102 can include one or more machine learning models (e.g., neural networks). The dialogue response system 102 can be implemented in a variety of different ways across the server(s) 104, the network 112, and the client device 108.

Figure 2:
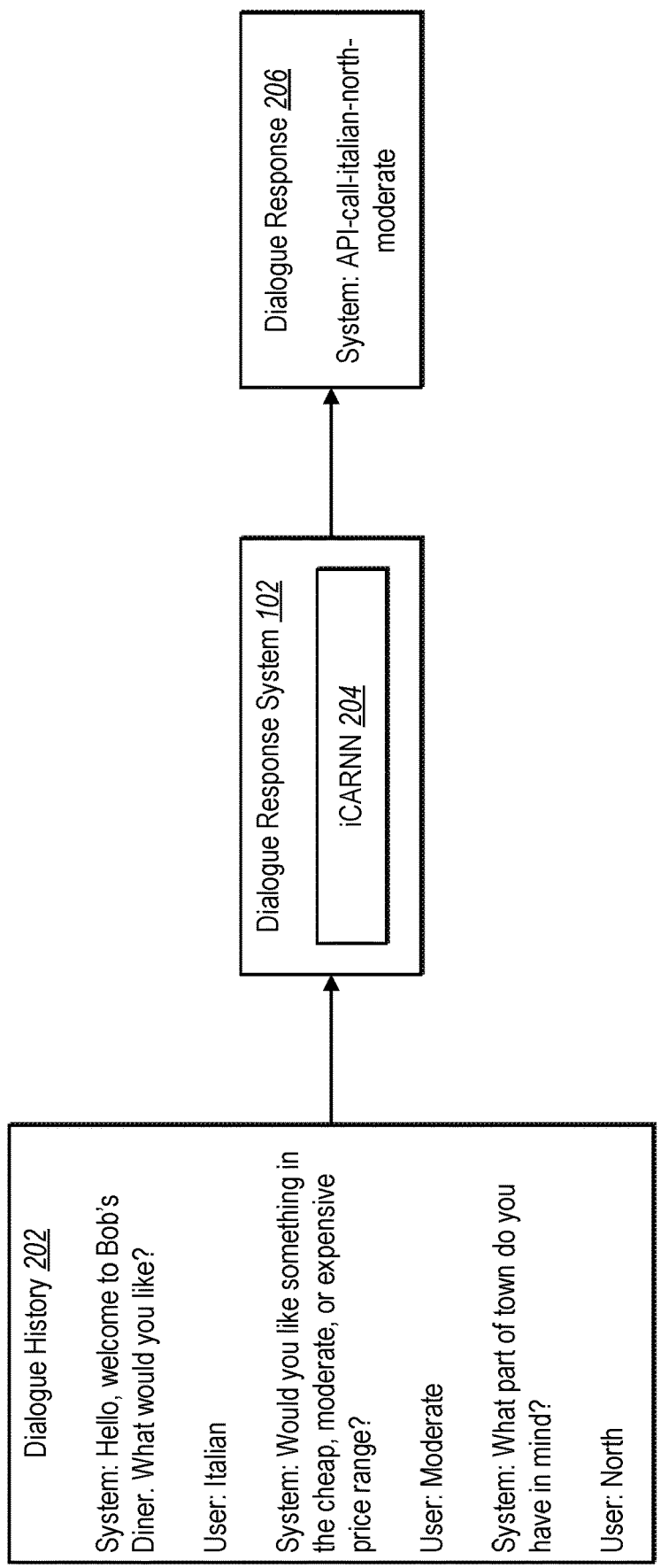
FIG. 2 illustrates an example flow for generating a dialogue response based on a dialogue history in accordance with one or more embodiments.

As mentioned above, the dialogue response system 102 can generate a dialogue response based on a dialogue history. FIG. 2 illustrates a high-level flow of generating dialogue response 206 based on a dialogue history 202. In particular, the dialogue response system 102 can receive the dialogue history 202 as input for generating the dialogue response 206 by utilizing the iCARNN 204.

Initially, to generate the dialogue history 202, the dialogue response system 102 conducts a dialogue with a user. Indeed, as illustrated in FIG. 2, the dialogue response system 102 is associated with a restaurant ordering system. For instance, the dialogue response system 102 detects a user presence and provides a welcome message such as, "Hello, welcome to Bob's Diner. What would you like?" The dialogue response system 102 can receive a reply from the user such as "Italian food." The dialogue response system 102 can continue to ask further questions to carry the dialogue and gather more details about what the user wants. For example, the dialogue response system 102 can ask, "Would you like something in the cheap, moderate, or expensive price range?" Upon receiving a user reply, "Moderate," the dialogue response system 102 can further inquire, "What part of town do you have in mind?" whereupon the user can reply "North."

Based on the illustrated interchange between the user and the dialogue response system 102 in FIG. 2, the dialogue response system 102 can utilize the iCARNN 204 to generate the dialogue response 206. To illustrate, the dialogue response system 102 can generate, for each utterance within the dialogue history 202 a corresponding vector representation. For instance, the dialogue response system 102 can utilize a position encoder model to encode each utterance (e.g., user utterance and/or system utterance) into a vector representation.

In addition, the dialogue response system 102 can generate or determine contextual information associated with the dialogue history 202. For example, the dialogue response system 102 can identify a previous utterance as a contextual information parameter. In FIG. 2, the dialogue response system 102 can identify the user utterance of "North" as the contextual information associated with the current user-system dialogue. Thus, the dialogue response system 102 can utilize the contextual information parameter within the iCARNN 204 to generate the dialogue response 206.

Based on the vector representations of the utterances within the dialogue history as well as the contextual information, the dialogue response system 102 can generate a dialogue history vector utilizing the iCARNN 204. For instance, the dialogue response system 102 can utilize one or more instances of the iCARNN 204 to generate, for each utterance, a corresponding hidden vector output. Based on the hidden vector outputs, the dialogue response system 102 can further generate a dialogue history vector for the dialogue history 202 as a whole. Additional detail regarding the architecture and the functionality of the iCARNN 204 is provided with reference to FIGS. 3 and 4.

As illustrated in FIG. 2, the dialogue response system 102 can further generate the dialogue response 206. In particular, the dialogue response system 102 can access a database of candidate dialogue responses. The dialogue response system 102 can further utilize a position encoder model to encode candidate dialogue responses into vector representations. In some embodiments, the dialogue response system 102 can additionally or alternatively utilize a vector representation model (e.g., Word2Vec or GloVe) to generate vector representations of candidate dialogue responses.

Based on the vector representations of the candidate dialogue responses, the dialogue response system 102 can further determine a distribution associated with the candidate responses. For instance, the dialogue response system 102 determines a probability distribution of the candidate responses in vector space, where the probability distribution is conditioned on the generated dialogue history vector. Additionally, the dialogue response system 102 can select a dialogue response from the distribution of candidate dialogue responses. For example, the dialogue response system 102 can select a dialogue response with a highest probability of matching a dialogue history.

In some embodiments, the dialogue response system 102 can utilize or call an API to generate the dialogue response 206. For example, the dialogue response system 102 can utilize the iCARNN based on the generated dialogue history vector to learn an appropriate API call. Indeed, the dialogue response system 102 can generate an API call to utilize in conjunction with a particular API to generate the dialogue response 206. In some embodiments, the dialogue response system 102 can call a third-party API via a network (e.g., network 112). Based on generating an API call, the dialogue response system 102 can thereby generate a dialogue response based 206 for the dialogue history 202.

Although FIG. 2 illustrates generating a particular dialogue response 206 based on a dialogue history 202, each generated statement or question within the illustrated dialogue history 202 can also refer to a generated dialogue response. Indeed, the dialogue response system 102 is adaptive in that, as a conversation continues and grows in its number of user utterances and system responses, the dialogue response system 102 utilizes the expanding dialogue history to generate subsequent dialogue responses. In some embodiments, the dialogue response system 102 generates dialogue responses associated with respective time steps. As an example, the dialogue response system 102 can generate the dialogue response "What part of town do you have in mind?" based on the then-available dialogue history that includes each user utterance and system response ("Hello, welcome do Bob's Diner. What would you like?," "Italian food," "Would you like something in the cheap, moderate, or expensive price range?," and "Moderate") up to that point.

Figure 3:
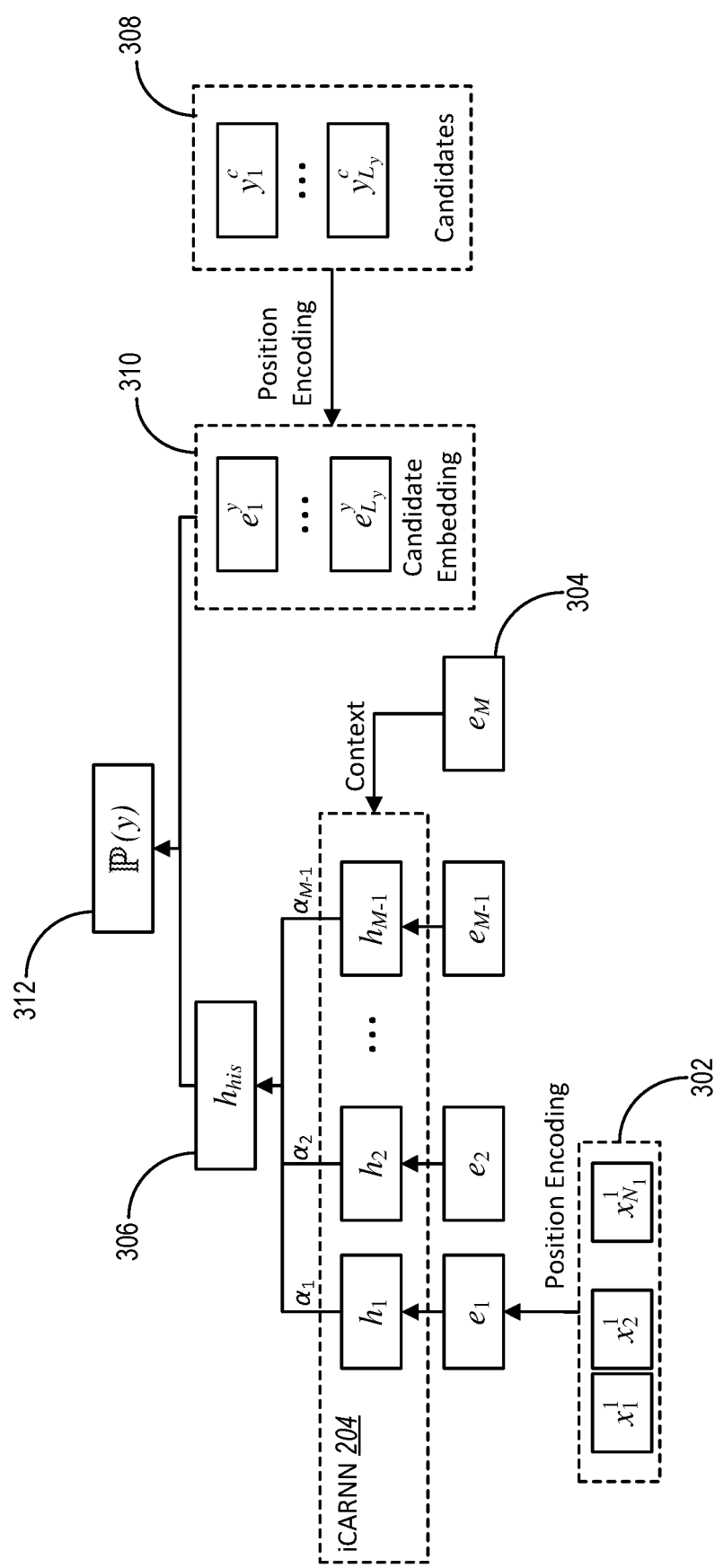
FIG. 3 illustrates an example architecture for an end-to-end dialogue system for generating dialogue responses in accordance with one or more embodiments.

As mentioned, the dialogue response system 102 generates a dialogue history vector and a dialogue response within an end-to-end dialogue scenario. Indeed, FIG. 3 illustrates an iCARNN 204 that the dialogue response system 102 utilizes in the context of end-to-end dialogue, where the dialogue response system 102 generates output responses based on input conversation dialogue. As shown, the dialogue response system 102 generates dialogue responses utilizing at least two main encoding steps: 1) encoding utterances into real vectors, and 2) encoding the sequence of real vectors into a dialogue history vector.

As illustrated, the dialogue response system 102 generates word embeddings associated with utterances. For example, the dialogue response system 102 can generate word embeddings for utterances, the word embeddings represented by:

$$x_1^m, x_2^m, \ldots, x_{N_m}^m$$

where x represents a word within the $m^{th}$ utterance of a sequence of utterances, and where N represents the number of words within the $m^{th}$ utterance.

To generate the representation for a whole utterance, the dialogue response system 102 can utilize a position encoder model. To illustrate, the dialogue response system 102 can utilize a position encoder to encode a word sequence or utterance sequence based on the relative position of the elements in a given sequence. Indeed, the dialogue response system 102 can encode an utterance based on the position of its constituent words relative to each other as well as based on its position relative to other utterances. For example, the dialogue response system 102 can utilize the position encoder model set forth by F. Liu and J. Perez in *Gated End-to-End Memory Networks*, Proceedings of the $15^{th}$ Conference of the European Chapter of the Association for Computational Linguistics: Vol. 1, Long Papers, Association for Computational Linguistics, 1-10 (2017).

The dialogue response system 102 generates a vector representation of the first utterance (m=1 for position encoding 302), where the vector representation is given by $e_1$. Likewise, the dialogue response system 102 can generate vector representations for subsequent utterances as well. Indeed, the dialogue response system 102 can generate a sequence of vectors for utterances, given by:

$$e_1, e_2, \ldots, e_{M-1}$$

where e represents a given utterance vector, M represents a current utterance corresponding to a current time step, and M−1 therefore represents a previous utterance corresponding to a previous time step.

As mentioned, the dialogue response system 102 generates hidden vector outputs $h_1, h_2, \ldots, h_{M-1}$ associated with utterances at corresponding time steps 1, 2, ..., M−1. In particular, the dialogue response system 102 utilizes the iCARNN 204 to generate hidden vector outputs $h_1, h_2, \ldots, h_{M-1}$ utilizing an update gate and a reset gate. The iCARNN 204 can further include an attention mechanism, where various hidden vector outputs can correspond to respective attention weights given by $a_1, a_2, \ldots, a_m$. By utilizing an attention mechanism as part of the iCARNN 204, the dialogue response system 102 can emphasize certain aspects or parameters within one or more layers of the iCARNN 204. Additional detail regarding generating individual hidden vector outputs that the dialogue response system 102 utilizes to generate a dialogue history vector is provided with reference to FIG. 4.

As mentioned, the dialogue response system 102 further determines global contextual information 304 associated with received utterances. In particular, the dialogue response system 102 determines contextual information 304 as a current utterance (e.g., an utterance associated with a current time step). In some embodiments, the dialogue response system 102 can identify a different (e.g., previous) utterance as contextual information for informing the iCARNN 204. To determine the contextual information 304, the dialogue response system 102 can utilize a position encoder model and/or vector representation model to generate a vector representation from a source of information. For instance, in cases where the dialogue response system 102 utilizes a current utterance as contextual information, the dialogue response system 102 generates a vector representation of a current (e.g., most recently received) utterance.

The dialogue response system 102 further generates a dialogue history vector 306 based on the global contextual information and the hidden vector outputs of the iCARNN 204, the dialogue history vector 306 represented by $h_{his}$. In particular, the dialogue response system 102 generates the dialogue history vector 306 by generating a combination of the hidden vector outputs associated with different time steps. Thus, the dialogue response system 102 generates a dialogue history vector 306 that represents a conversation of one or more utterances in vector space.

In addition, to enhance the output of the iCARNN 204, the dialogue response system 102 further adds a residual connection to the input as well as an attention mechanism over the dialogue history. For instance, the dialogue response system 102 can generate the dialogue history vector 306 according to:

$$h_1, \ldots, h_{M-1} = iCARNN(e_1, \ldots, e_{M-1}, c);$$

$$\forall m \in [1 \ldots M-1]: \tilde{h}_m = h_m + e_m;$$

$$\alpha_1, \ldots, \alpha_{M-1} = softmax(\tilde{h}_1^T c, \ldots, \tilde{h}_{M-1}^T c); \text{ and}$$

$$h_{his} = \sum_{m=1}^{M-1} \alpha_m \tilde{h}_m$$

where a are the attention weights associated with the attention mechanism, $h_m$ is the $m^{th}$ hidden output of the iCARNN 204, $e_m$ is the embedding (vector representation) of the $m^{th}$ input utterance, ∀m represents the residual connection, softmax is a normalizing function to create a probability based on multiplying vectors together, $c = e_M$ is the context embedding (the vector representation of the contextual information), and $\tilde{h}_m$ is a candidate update or an affine transformation of the embedding $e_M$.

As further illustrated in FIG. 3, the dialogue response system 102 generates a dialogue response. In particular, the dialogue response system 102 identifies one or more candidate responses 308 from a database. The candidate responses 308 can be pre-determined by the dialogue response system 102 or by an administrator, and the dialogue response system 102 can maintain the candidate responses 308, for example, in a response database. As shown, the dialogue response system 102 can represent the candidate responses 308 by $y_1^c, y_2^c, \ldots y_L^c$, where $y^c$ represents a given candidate response and L is the total number of candidate responses. Accordingly, the dialogue response system 102 can utilize a position encoder and/or vector representation model to generate candidate embeddings 310 (e.g., vector representations of candidate responses), represented by $e_1^y, e_2^y, \ldots, e_L^y$ where $e^y$ represents a given candidate embedding of L total candidate embeddings. Indeed, the dialogue response system 103 can generate candidate embeddings 310 according to:

$$\forall l \in [1 \ldots L]: e_l = \text{Position\_Encoder}(y_l^c)$$

where Position_Encoder is a function call for a position encoder model.

Based on the embeddings 310 of the candidate responses 308, and further based on the dialogue history vector 306, the dialogue response system 102 further generates a distribution 312 to determine a dialogue response. In particular, the dialogue response system 102 utilizes a distribution function conditioned on the summarized dialogue history to determine the distribution 312, where the distribution function is given by:

$$\mathbb{P}(y) = \text{softmax}(h_{his}^T e_1^y, \ldots, h_{his}^T e_L^y)$$

where softmax is a normalizing function to create a probability based on multiplying vectors together, $h_{his}^T$ is a dialogue history vector, and $e_L^y$ is the $L^{th}$ candidate embedding. In some embodiments, the dialogue response system 102 utilizes a different distribution such as a normal probability distribution, a binomial distribution, a Poisson distribution, or a different type of distribution function.

Figure 4:
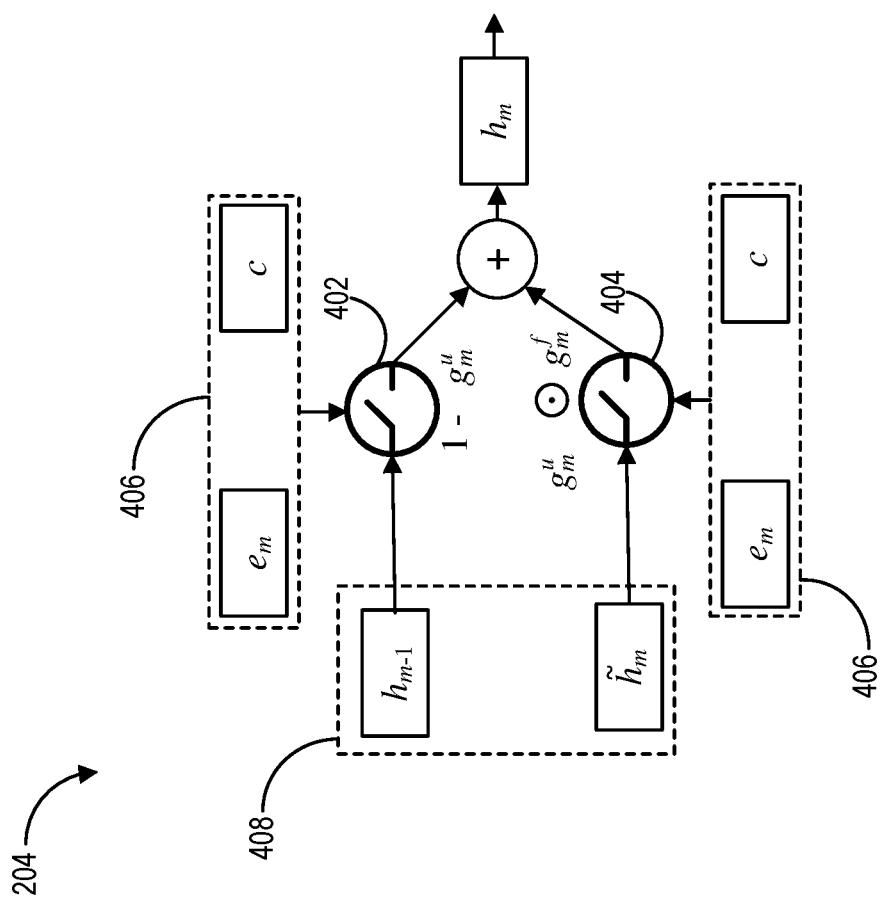
FIG. 4 illustrates an example architecture of an independent gate context-dependent additive recurrent neural network in accordance with one or more embodiments.

As mentioned, the dialogue response system 102 utilizes a particular neural network model called the iCARNN to generate a dialogue history vector based on utterance vectors. FIG. 4 illustrates an example architecture of the iCARNN 204 in accordance with one or more embodiments. Based on the architecture shown in FIG. 4, the dialogue response system 102 utilizes the iCARNN 204 to generate hidden vector outputs used to generate the dialogue history vector $h_{his}$. As shown, the iCARNN 204 includes a first gate 402 called an update gate and a second gate 404 called a reset gate. Additionally, the iCARNN includes an input layer 406 and a hidden unit layer 408. Based on the input to the iCARNN 204, the iCARNN 204 produces output in the form of a hidden vector output $h_m$.

As mentioned, the iCARNN 204 includes a first gate 402 which is sometimes referred to as an update gate. In some embodiments, the first gate 402 restricts flow through the iCARNN 204. In particular, the first gate 402 restricts flow through the iCARNN 204 according to its gate function:

$$g_m^u = \sigma(W_u^c c + W_u^e e_m + b_u)$$

where $g_m^u$ represents the first gate 402, $\sigma$ is the sigmoid function, $W^c$ is a dimension reduction matrix associated with the global contextual information c, $W^e$ is a dimension reduction matrix associated with a given utterance vector $e_m$, b is a bias term, and u indicates the update gate.

As also mentioned, the iCARNN 204 includes a second gate 404 sometimes referred to as a reset gate. In some embodiments, the second gate 404 restricts input for the iCARNN 204. In particular, the second gate 404 restricts the input of the iCARNN 204 according to its gate function:

$$g_m^f = \sigma(W_f^c c + W_f^e e_m + b_f)$$

where $g_m^f$ represents the second gate 404, $\sigma$ is the sigmoid function, $W^c$ is a dimension reduction matrix associated with the global contextual information c, $W^e$ is a dimension reduction matrix associated with a given utterance vector $e_m$, b is a bias term, and f indicates the reset gate.

As shown in FIG. 4, the iCARNN 204 generates an output of the first gate 402 and an output of the second gate 404. For instance, the dialogue response system 102 determines an output associated with the first gate 402 as:

$$1 - g_m^u$$

and further determines an output associated with the second gate 404 as:

$$g_m^u \odot g_m^f$$

where $\odot$ denotes an element-wise product between vectors.

As shown, the first gate 402 is independent of the second gate 404, and vice-versa. In other words, the output of the first gate 402 does not depend on the output of the second gate 404, and the output of the second gate 404 does not depend on the output of the first gate 402. Thus, the iCARNN 204 combines the outputs of the gates as, for example, a weighted sum according to:

$$h_m = g_m^u \odot (g_m^f \odot \tilde{e}_m) + (1 - g_m^u) \odot h_{m-1}$$

given:

$$\tilde{e}_m = W_{\tilde{e}} e_m + b_{\tilde{e}}$$

where $\odot$ denotes an element-wise product, $\tilde{e}_m$ is an affine transformation, $W_{\tilde{e}}$ is a dimension reduction matrix, and $b_{\tilde{e}}$ is a bias term.

To generate the hidden vector output $h_m$, the iCARNN 204 includes an input layer 406. For example, the input layer 406 includes a current utterance vector $e_m$ and contextual information c which the iCARNN 204 combines to generate the hidden vector output $h_m$ as described above. In addition, the iCARNN 204 ignores local contextual information because c is generally a strong enough signal to regulate information flow, thereby improving efficiency over conventional systems. For instance, the dialogue response system 102 can utilize more than one instance of the iCARNN 204 in parallel by removing sequential data from the input layer 406. Removing the local context in this way can reduce the complexity of the model compared to conventional models. Indeed, the iCARNN 204 has fewer parameters, less non-linearity, and easier gradient flow than models in conventional systems, which enables the dialogue response system 102 to perform better than these conventional systems.

To enable the dialogue response system 102 to determine outputs of the iCARNN 204 in parallel, the iCARNN 204 removes or does not include local contextual information that would otherwise prevent parallel analysis. Indeed, the dialogue response system 102 can determine weights for each input in parallel and can determine a weighted sum to produce a hidden vector output. For instance, by excluding a previous hidden vector output (e.g., $h_{m-1}$) from the input layer 406, the dialogue response system 102 can determine multiple outputs in parallel. The dialogue response system 102 can therefore train and perform faster than conventional systems that ordinarily require such local context. The iCARNN 204 additionally retains a sequential nature because, even though the gates at different time steps are not dependent on each other, the hidden vector output at the $m^{th}$ time step, $h_m$, is dependent on the previous gate $g_{m-1}^u$ and is therefore dependent on the previous input.

As further illustrated in FIG. 4, the iCARNN 204 includes a hidden unit layer 408. The hidden unit layer 408 can include information such as a previous hidden unit—i.e., a hidden unit associated with a previous time step, $h_{m-1}$. The hidden unit layer 408 can also include a candidate update $\tilde{h}_m$ in the form of an affine transformation of the utterance embedding $e_m$.

As mentioned, the iCARNN 204 produces an output in the form of a hidden vector $h_m$ associated with a current time step. The dialogue response system 102 can utilize multiple instances of the iCARNN 204 to produce multiple outputs in parallel. Indeed, the iCARNN 204 can produce a first output $h_1$ for a first-time step, a second output $h_2$ for a second time step, and so forth until the final word or utterance of a sequence.

Figure 5:
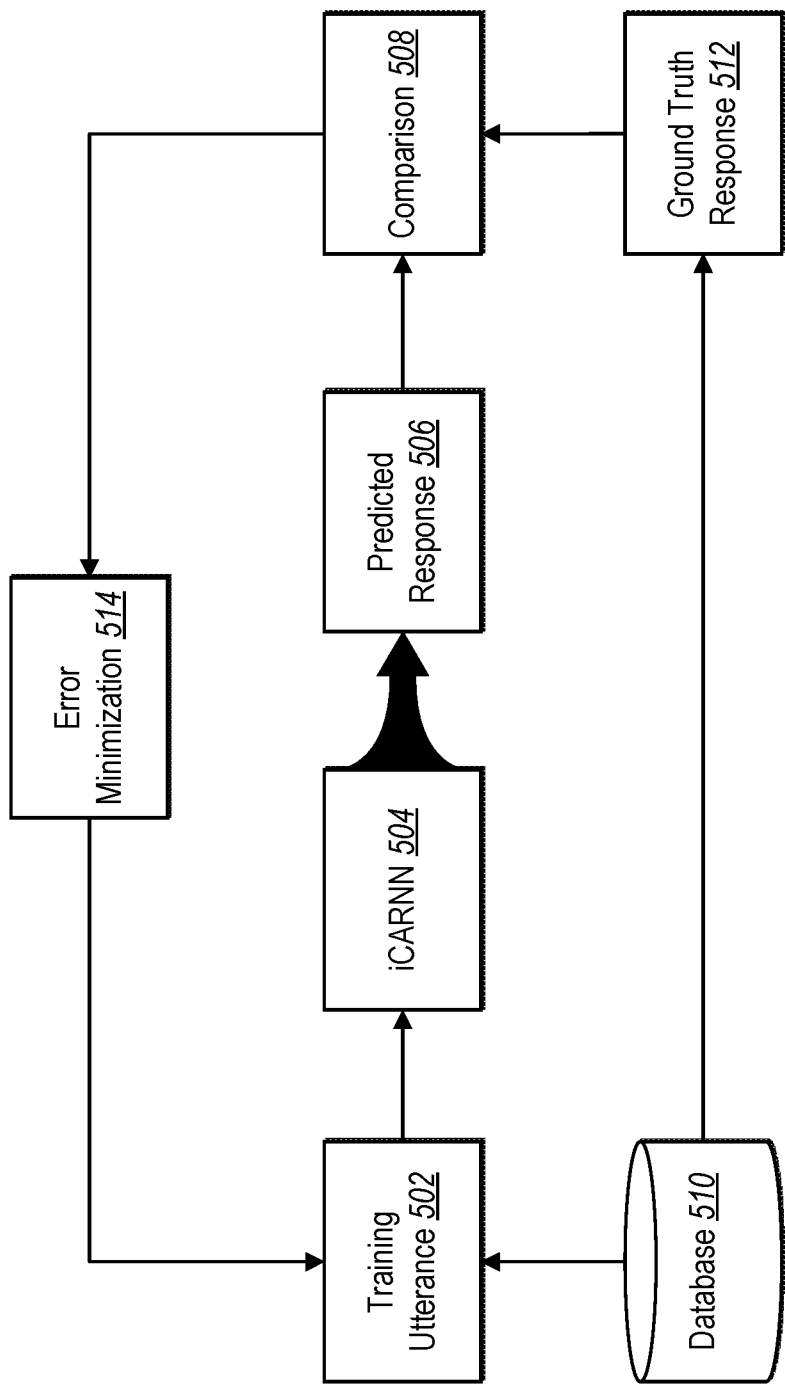
FIG. 5 illustrates an example process for training an independent gate context-dependent additive recurrent neural network in accordance with one or more embodiments.

As mentioned, the dialogue response system 102 can train the iCARNN 204 to generate a dialogue history vector $h_{his}$. FIG. 5 illustrates an example process for training an iCARNN 504 (e.g., the iCARNN 204) in accordance with one or more embodiments. As shown, the dialogue response system 102 can access a database 510 to identify a training utterance 502 and a ground truth response 512. In addition, the dialogue response system 102 can utilize the training utterance 502 as input for the iCARNN 504. In turn, the iCARNN 504 generates an output in the form of a predicted response 506. Particularly, the iCARNN 504 generates the predicted response 506 based on the training utterance 502, in accordance with the architecture and techniques described herein.

The dialogue response system 102 can further perform a comparison 508 of the predicted response 506 and the ground truth response 512. In particular, the dialogue response system 102 can compare the predicted response 506 generated by the iCARNN 504 with a ground truth response 512 to determine a difference, error, or measure of loss between them. For example, the dialogue response system 102 can utilize one or more loss functions such as a mean square error loss function, a cross-entropy loss function, a Kullback-Leibler loss function, or some other loss function. In this way, the dialogue response system 102 can determine a distance (e.g., in vector space) of the predicted response 506 from the ground truth response 512, thereby determining a level of accuracy of the iCARNN 504.

In addition, the dialogue response system 102 can perform an error minimization 514 to reduce or minimize the measure of loss between the predicted response 506 and the ground truth response 512. Particularly, the dialogue response system 102 can modify one or more parameters associated with the iCARNN 504 to improve its accuracy. In some embodiments, the dialogue response system 102 can modify parameters such as attention weights, bias terms, dimension reduction matrices, or other parameters. By modifying the parameters, the dialogue response system 102 improves the accuracy of the iCARNN 504. Thus, by repeating the process illustrated in FIG. 5, the dialogue response system 102 can train or tune the iCARNN 504 to generate predicted responses that are within a threshold error of corresponding ground truth responses. Indeed, the dialogue response system 102 can repeatedly access training utterances and corresponding ground truth responses from the database 510 to use as training data for the iCARNN 504 to iteratively train the iCARNN 504.

Figure 6:
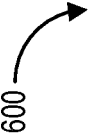
FIG. 6 illustrates a table of accuracy metrics associated with the independent gate context-dependent additive recurrent neural network as compared conventional systems in accordance with one or more embodiments.

As mentioned, the dialogue response system 102, by virtue of utilizing an iCARNN, is more accurate than conventional systems. FIG. 6 illustrates a table 600 showing accuracy improvements associated with the dialogue response system 102 based on application of two different datasets: the Babi Task 6 dataset and the Frame dataset. As shown, the iCARNN architecture of the dialogue response system 102 enjoys a greater measure of accuracy with each of these datasets.

As illustrated, to generate the results of table 600, the dialogue response system 102 are set to the task of generating complete responses to learn dialogue behavior from ground truth responses without the help of manual features, rules, or templates. The Babi Task 6 dataset utilizes a limited set of pre-determined candidate responses from which a system selects based on various probability determinations such as those described herein. Contrarily, the Frame dataset utilizes free form responses. To test, the responses of the Frame dataset can be grouped into 129 response classes, and 80% of the data can be randomly utilized for training, while 10% is used for testing and 10% for development.

The table 600 illustrates performance on the Babi Task 6 dataset for several state-of-the-art models such as the Query Reduction Network described by M. Seo, S. Min, A. Farhadi, and H. Hajishirzi in *Query-Regression Networks for Machine Comprehension* (2016), the Gated Memory Network described by F. Liu and J. Perez in *Gated End-to-End Memory Networks* (2016), and the Memory Network described by S. Sukhbaatar, J. Weston, R. Fergus, et al. in *End-to-End Memory Networks* (2015). As shown, the Query Reduction Network has an accuracy on the Babi Task 6 dataset of 47.9%, the Gated Memory Network has an accuracy of 47.4%, and the Memory Network has an accuracy of 41.1%. Additionally, table 600 illustrates the superiority of the iCARNN model, which enjoys an accuracy on the Babi Task 6 dataset of 50.2%.

Similarly, table 600 illustrates the superior accuracy of the iCARNN model when applied to the Frame dataset. As shown, the iCARNN model has an accuracy of 28.4%, while the Query Reduction Network has an accuracy of 25.5% and the Gated Memory Network has an accuracy of 23.6%.

Figure 7:
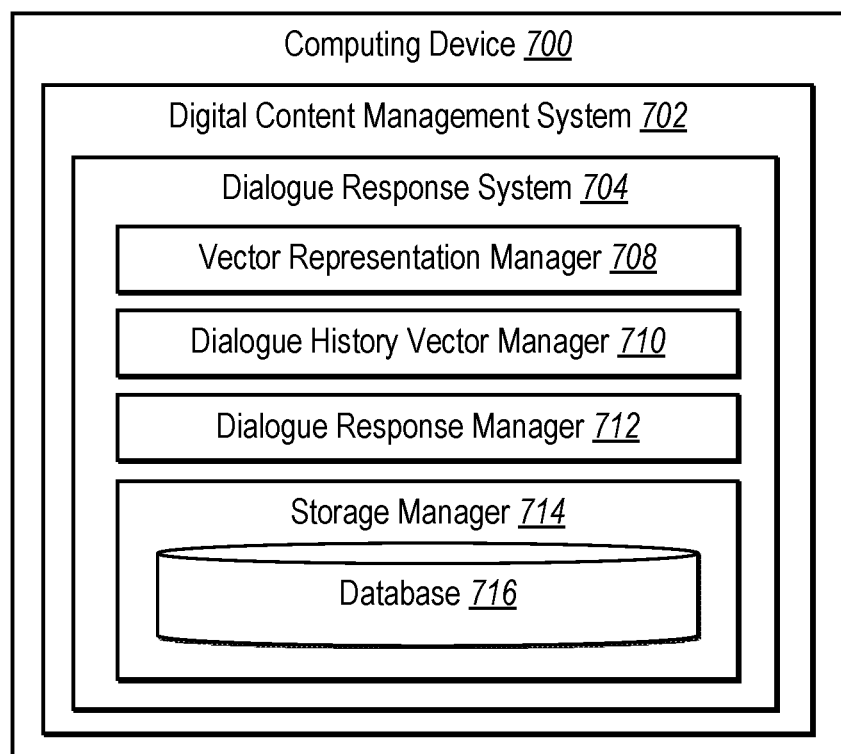
FIG. 7 illustrates a schematic diagram of a dialogue response system in accordance with one or more embodiments.

Looking now to FIG. 7, additional detail will be provided regarding components and capabilities of a dialogue response system 704 (e.g., an exemplary embodiment of the dialogue response system 102). Specifically, FIG. 7 illustrates an example schematic diagram of the dialogue response system 704 on an example computing device 700 (e.g., one or more of the client device 108, and/or the server(s) 104). As shown in FIG. 7, the dialogue response system 704 may include a vector representation manager 708, a dialogue history vector manager 710, a dialogue response manager 712, and a storage manager 714.

As mentioned, the dialogue response system 704 includes a vector representation manager 708. In particular, the vector representation manager 708 can manage, utilize, or maintain a position encoder model. In addition, the vector representation manager 708 can determine, generate, identify, encode, embed, or produce representations of utterances. Indeed, as described above, the vector representation manager 708 can encode utterances in vector space in accordance with the disclosure herein.

As further illustrated in FIG. 7, the dialogue response system 704 includes a dialogue history vector manager 710. In particular, the dialogue history vector manager 710 can generate, determine, embed, or encode a dialogue history vector based on hidden vectors. Indeed, as described, the dialogue history vector manager 710 can utilize an iCARNN to generate hidden vector outputs based on input utterance vectors. Additionally, based on the hidden vector outputs, the dialogue history vector manager 710 can generate a dialogue history vector as described herein.

As shown, the dialogue response system 704 further includes a dialogue response manager 712. In particular, the dialogue response manager 712 can generate, determine, or produce a dialogue response based on a dialogue history vector. Indeed, the dialogue response manager 712 can generate a dialogue response in digital text form and/or digital audio form. Additionally, the dialogue response manager 712 can distribute or provide the dialogue response to one or more client devices.

In addition, the dialogue response system 704 includes a storage manager 714. The storage manager 714 can manage or maintain a database 716. In particular, the database 716 can include various data such as training data (e.g., training utterances and ground truth responses) and/or candidate dialogue responses. Thus, the storage manager 714 can communicate with one or more of the other components of the dialogue response system 704 to provide information stored within the database 716.

As illustrated, the dialogue response system 704 and its components can be included in a digital content management system 702 (e.g., the digital content management system 106). In some embodiments, the digital content management system 702 can refer to a digital agent system for communicating with one or more users via digital audio, text, or by some other means. Indeed, the digital content management system 702 can receive verbal prompts in the form of one or more utterances and can response to the verbal prompts accordingly, as described herein. In one or more embodiments, each of the components of the dialogue response system 704 are in communication with one another using any suitable communication technologies. Additionally, the components of the dialogue response system 704 can be in communication with one or more other devices including one or more user client devices described above. It will be recognized that although the components of the dialogue response system 704 are shown to be separate in FIG. 7, any of the subcomponents may be combined into fewer components, such as into a single component, or divided into more components as may serve a particular implementation. Furthermore, although the components of FIG. 7 are described in connection with the dialogue response system 704, at least some of the components for performing operations in conjunction with the dialogue response system 704 described herein may be implemented on other devices within the environment.

The components of the dialogue response system 704 can include software, hardware, or both. For example, the components of the dialogue response system 704 can include one or more instructions stored on a computer-readable storage medium and executable by processors of one or more computing devices (e.g., the computing device 700). When executed by the one or more processors, the computer-executable instructions of the dialogue response system 704 can cause the computing device 700 to perform the methods described herein. Alternatively, the components of the dialogue response system 704 can comprise hardware, such as a special purpose processing device to perform a certain function or group of functions. Additionally, or alternatively, the components of the dialogue response system 704 can include a combination of computer-executable instructions and hardware.

Furthermore, the components of the dialogue response system 704 performing the functions described herein may, for example, be implemented as part of a stand-alone application, as a module of an application, as a plug-in for applications including content management applications, as a library function or functions that may be called by other applications, and/or as a cloud-computing model. Thus, the components of the dialogue response system 704 may be implemented as part of a stand-alone application on a personal computing device or a mobile device. Alternatively, or additionally, the components of the dialogue response system 704 may be implemented in any application that allows creation and delivery of marketing content to users, including, but not limited to, applications in ADOBE CREATIVE CLOUD and/or ADOBE MARKETING CLOUD, such as ADOBE CAMPAIGN, ADOBE ANALYTICS, and ADOBE MEDIA OPTIMIZER. "ADOBE," "CREATIVE CLOUD," "MARKETING CLOUD," "CAMPAIGN," "ANALYTICS," and "MEDIA OPTIMIZER," are registered trademarks of Adobe Systems Incorporated in the United States and/or other countries.

FIGS. 1-7, the corresponding text, and the examples provide a number of different systems, methods, and non-transitory computer readable media for generating and providing dialogue responses. In addition to the foregoing, embodiments can also be described in terms of flowcharts comprising acts for accomplishing a particular result. For example, FIG. 8 illustrates a flowchart of an example sequence of acts in accordance with one or more embodiments.

Figure 8:
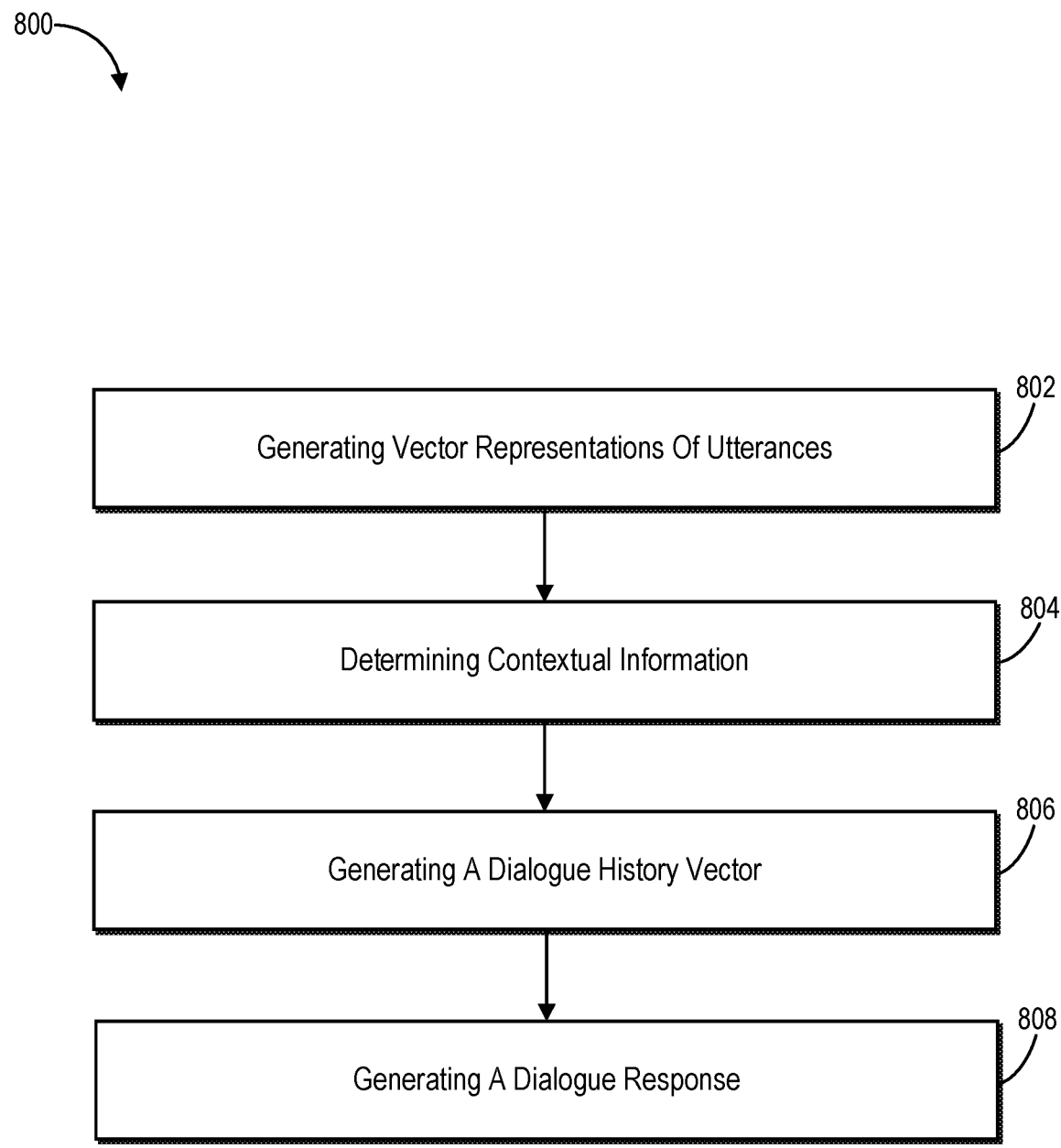
FIG. 8 illustrates a flowchart of a series of acts for generating a dialogue response in accordance with one or more embodiments.

While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8. Additionally, the acts described herein may be repeated or performed in parallel with one another or in parallel with different instances of the same or other similar acts.

FIG. 8 illustrates an example series of acts 800 of generating a dialogue response related to a dialogue conversation. This series can include an act 804 of generating vector representations of utterances. In particular, the act 804 can include generating vector representations for the one or more utterances based on their respective position encodings. The act 804 can further involve utilizing a vector representation model to generate vector representations.

As further shown, the series of acts 800 can include an act 806 of determining contextual information. In particular, the act 806 can involve determining contextual information associated with the one or more utterances. The act 806 can also involve analyzing the one or more utterances to determine a sequence associated with the one or more utterances.

Additionally, the series of acts 800 can include an act 808 of generating a dialogue history vector. In particular, the act 808 can involve, based on the contextual information and the vector representations of the one or more utterances, generating, utilizing an independent-gate context-dependent additive recurrent neural network, a dialogue history vector for the one or more utterances. The independent gate context-dependent additive recurrent neural network includes a first gate that restricts input based on a current utterance and a second gate that restricts flow based on a previous utterance. The act 808 can further involve generating, for each utterance of the one or more utterances, a corresponding hidden vector output.

Additionally, the independent gate context-dependent additive recurrent neural network can include an input layer comprising a vector representation of a current unit and further comprising global contextual information associated with a plurality of units and a hidden unit layer comprising a vector representation of a current hidden unit and a vector representation of a previous hidden unit. Furthermore, the independent gate context-dependent additive recurrent neural network can include a first gate to restrict input of the independent gate context-dependent additive recurrent neural network by generating a first gate output as a combination of the vector representation of the current unit, the global contextual information associated with the plurality of units, and the vector representation of the current hidden unit. The independent gate context-dependent additive recurrent neural network can also include a second gate to restrict flow through the independent gate context-dependent additive recurrent neural network by generating a second gate output as a combination of the vector representation of the current unit, the global contextual information associated with the plurality of units, and the vector representation of the previous hidden unit. Furthermore, the independent gate context-dependent additive recurrent neural network can also include an output layer comprising a hidden vector output associated with a current time step.

The current hidden unit can refer to a hidden unit associated with the current time step, and the previous hidden unit can refer to a hidden unit associated with a previous time step. In addition, the hidden unit layer further can include a candidate update including an affine transformation of the vector representation of the current unit. Furthermore, the first gate and the second gate can be independent such that, for a given time step, an output of the first gate does not depend on an output of the second gate and the output of the second gate does not depend on the output of the first gate. Thus, the act 808 can involve computing the first and second gates at all time steps in parallel. Act 808 can additionally involve processing the first and second gates at different time steps without dependence of each other.

Furthermore, the series of acts 800 can include an act 810 of generating a dialogue response. In particular, the act 810 can involve generating, based on the dialogue history vector, a dialogue response corresponding to the one or more utterances. The act 810 can also involve utilizing the position encoder to encode one or more candidate dialogue responses, determining a distribution, conditioned on the dialogue history vector, of the one or more candidate dialogue responses, and selecting a candidate dialogue response of the one or more candidate dialogue responses with a highest probability of matching the one or more utterances.

The series of acts 800 can further include an act of training the neural network model to generate dialogue responses based on input utterances. In addition, the series of acts 800 can include an act of receiving the one or more utterances from the user as verbally spoken sequences of words. The series of acts 800 can also include an act of providing the dialogue response to the client device. Providing the dialogue response can include providing an audio dialogue response playable by the client device or providing a text dialogue response for display by the client device.

Figure 9:
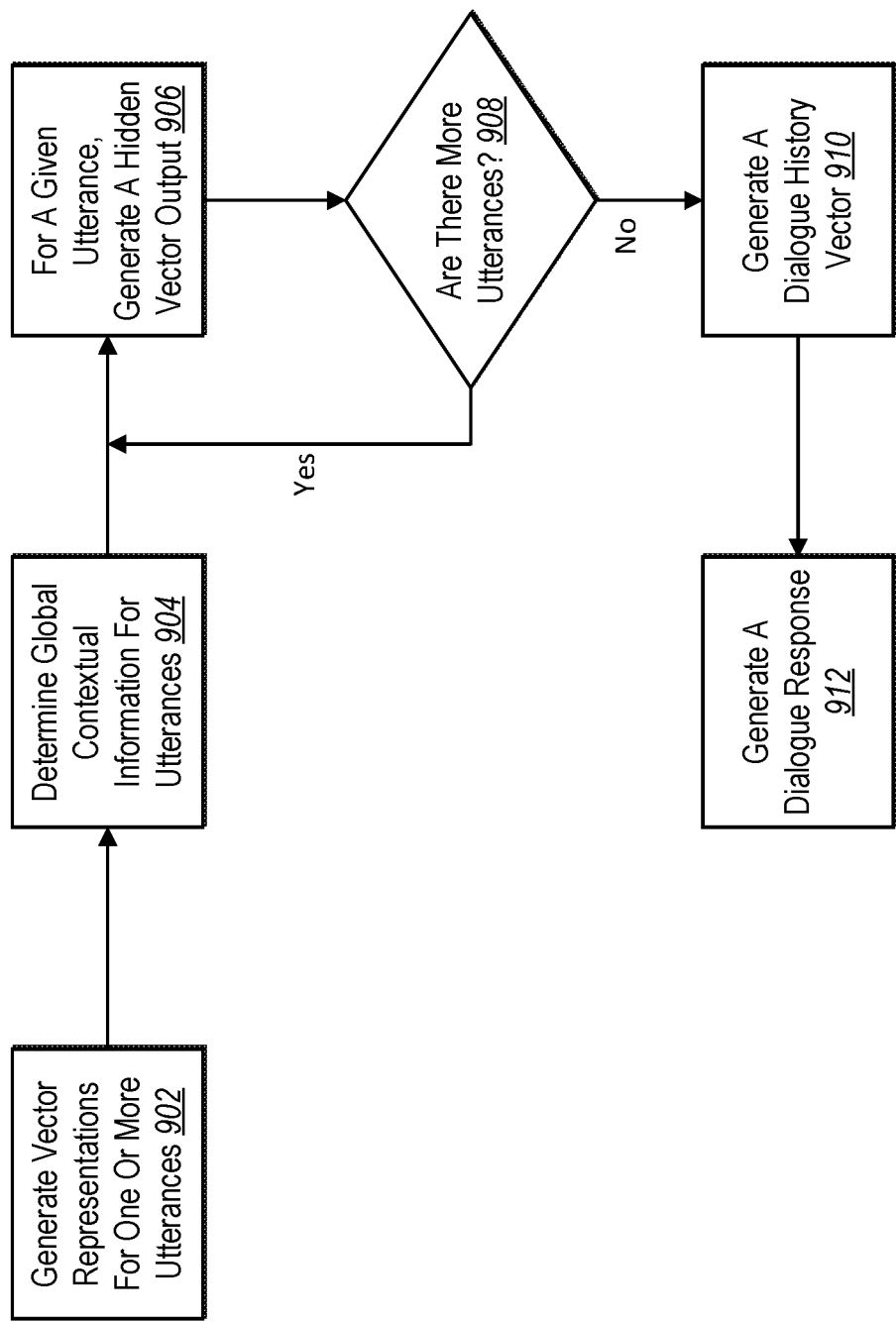
FIG. 9 illustrates a series of acts in a step for generating a dialogue response corresponding to the one or more received utterances based on a context-dependent sequence mapping formulation.

As mentioned, the dialogue response system 102 can generate a dialogue response based on a dialogue history. Indeed, FIG. 9 illustrates exemplary acts in a step for generating a dialogue response corresponding to the one or more received utterances based on a context-dependent sequence mapping formulation. As illustrated, the step for generating a dialogue response corresponding to the one or more received utterances based on a context-dependent sequence mapping formulation can include acts 902-912, in addition, or alternatively, to other acts described herein.

In particular, the dialogue response system 102 can perform an act 902 to generate vector representations for one or more utterances. As described, the dialogue response system 102 can generate vector representations utilizing a position encoder model and/or a vector representation model. For instance, the dialogue response system 102 can generate corresponding vector representations of the utterances.

As shown, the dialogue response system 102 can also perform an act 904 to determine global contextual information for one or more received utterances. Indeed, as described above, the dialogue response system 102 can identify a previous utterance, a current utterance, and/or one or more other utterances as contextual information to utilize as a strong signal for an iCARNN model in generating a dialogue history vector.

In addition, the dialogue response system 102 can perform an act 906 to, for a given utterance, generate a hidden vector output. For instance, the dialogue response system 102 can utilize a neural network model such as the iCARNN model described above to generate a hidden vector output corresponding to a given input utterance. Additionally, the dialogue response system 102 can perform an act 908 to determine whether there are more utterances to analyze—for which to generate hidden vector outputs. For example, the dialogue response system 102 can ascertain or determine whether there are more utterances within the dialogue history.

Upon determining that there are more utterances, the dialogue response system 102 can repeat act 906 to generate a hidden vector output corresponding to the utterance. In some embodiments, the dialogue response system 102 utilizes more than one instance of the iCARNN model to generate hidden vector outputs for multiple utterances in parallel. In other embodiments, the dialogue response system 102 analyzes utterances to generate output vectors in a more iterative or sequential manner.

As illustrated, the dialogue response system 102, in response to determining that there are no more utterances left to analyze (i.e., determining that the dialogue response system 102 has generate outputs related to each available input utterance), the dialogue response system 102 further performs an act 910 to generate a dialogue history vector. In particular, dialogue response system 102 combines the hidden output vectors as described above to generate the dialogue history vector to represent the dialogue history in vector space.

In addition, the dialogue response system 102 performs an act 912 to generate a dialogue response based on the dialogue history vector. As described above, the dialogue response system 102 can generate a dialogue response based on a set of candidate responses. For instance, the dialogue response system 102 can generate probability distribution over a set of pre-determined candidate responses. Based on the distribution, the dialogue response system 102 can select a candidate response with a highest probability of matching the dialogue history vector. In addition, the dialogue response system 102 can provide the dialogue response to a client device as digital text and/or digital audio for presentation to a user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
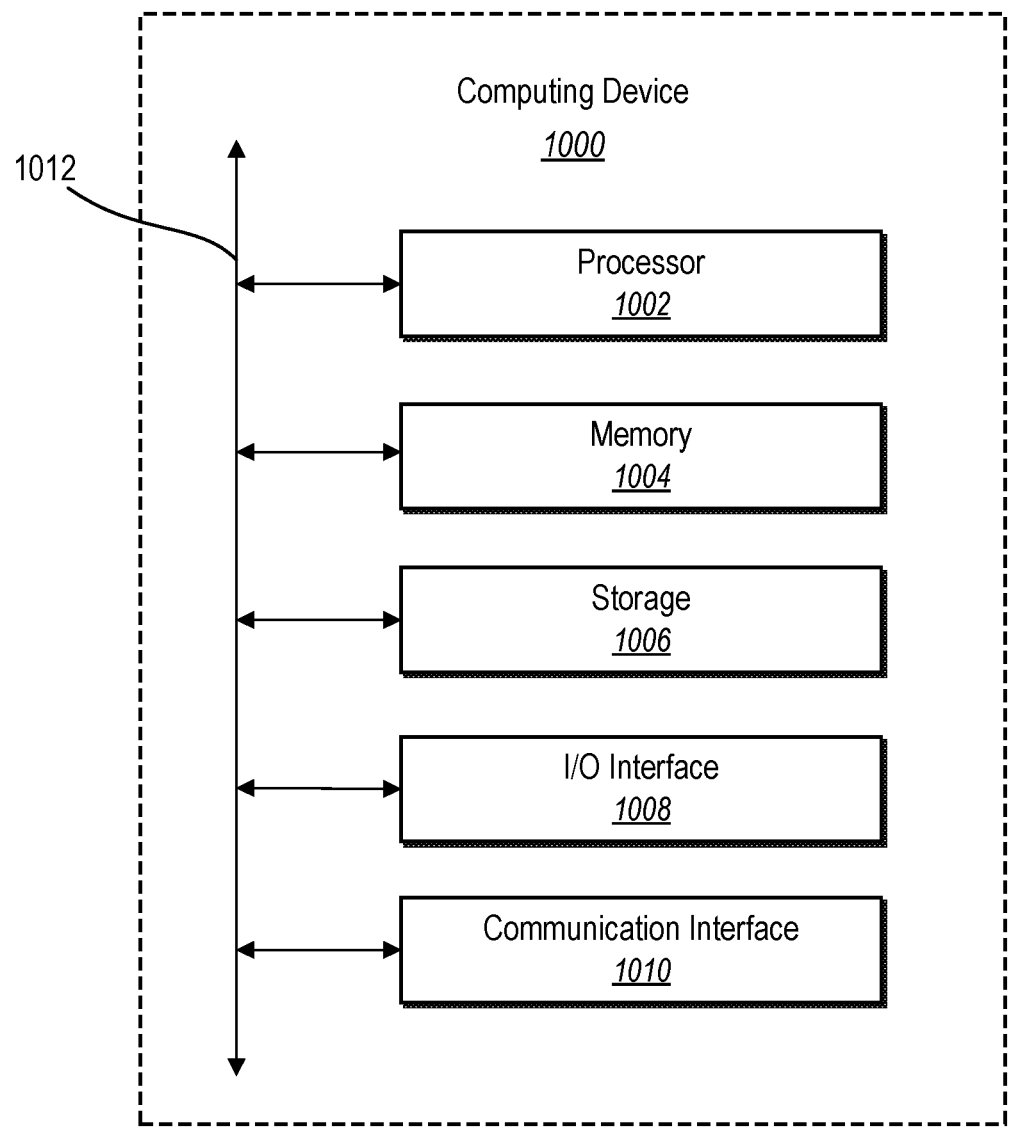
FIG. 10 illustrates a block diagram of an example computing device in accordance with one or more embodiments.

FIG. 10 illustrates, in block diagram form, an example computing device 1000 (e.g., computing device 700, client device 108, and/or server(s) 104) that may be configured to perform one or more of the processes described above. One will appreciate that the dialogue response system 102 can comprise implementations of the computing device 1000. As shown by FIG. 10, the computing device can comprise a processor 1002, memory 1004, a storage device 1006, an I/O interface 1008, and a communication interface 1010. Furthermore, the computing device 1000 can include an input device such as a touchscreen, mouse, keyboard, etc. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for providing end-to-end dialogue via a digital agent, a non-transitory computer readable medium comprising instructions that, when executed by at least one processor, cause a computing device to:
    generate vector representations for one or more utterances received from a user;
    determine global contextual information associated with the one or more utterances;
    generate a dialogue history vector for the one or more utterances, based on the global contextual information and the vector representations of the one or more utterances, utilizing an independent-gate context-dependent additive recurrent neural network comprising:
        a first gate that restricts input based on a current utterance; and
        a second gate that restricts flow based on a previous utterance, wherein the first gate and the second gate are independent from each other; and
    generate, based on the dialogue history vector, a dialogue response corresponding to the one or more utterances.

2. The non-transitory computer readable medium of claim 1, wherein the first gate and the second gate are independent such that, for a given time step, an output of the first gate does not depend on an output of the second gate and the output of the second gate does not depend on the output of the first gate.

3. The non-transitory computer readable medium of claim 1, further comprising instructions that, when executed by the at least one processor, cause the computing device to compute the first and second gates in parallel.

4. The non-transitory computer readable medium of claim 1, wherein the instructions, when executed by the at least one processor, cause the computing device to utilize the independent-gate context-dependent additive recurrent neural network to generate the dialogue history vector by generating, for each utterance of the one or more utterances, a corresponding hidden vector output.

5. The non-transitory computer readable medium of claim 4, further comprising instructions that, when executed by the at least one processor, cause the computing device to combine, for each utterance, outputs of the first gate and the second gate to generate the corresponding hidden vector output.

6. The non-transitory computer readable medium of claim 1, wherein the instructions, when executed by the at least one processor, cause the computing device to generate the vector representations of the one or more utterances by utilizing a vector representation model.

7. The non-transitory computer readable medium of claim 1, wherein the instructions, when executed by the at least one processor, cause the computing device to determine the global contextual information by analyzing the one or more utterances to determine a sequence associated with the one or more utterances.

8. The non-transitory computer readable medium of claim 1, wherein the instructions, when executed by the at least one processor, cause the computing device to generate the dialogue response by:
utilizing a position encoder to encode one or more candidate dialogue responses;
determining a distribution, conditioned on the dialogue history vector, of the one or more candidate dialogue responses; and
selecting a candidate dialogue response of the one or more candidate dialogue responses with a highest probability.

9. The non-transitory computer readable medium of claim 1, further comprising instructions that, when executed by the at least one processor, cause the computing device to receive the one or more utterances from the user as verbally spoken sequences of words.

10. The non-transitory computer readable medium of claim 1, further comprising instructions that, when executed by the at least one processor, cause the computing device to generate the dialogue response utilizing the independent-gate context-dependent additive recurrent neural network to ignore local contextual information.

11. A system comprising:
a memory device comprising an independent gate context-dependent additive recurrent neural network having a first gate and a second gate;
one or more server devices configured to cause the system to:
access a plurality of encodings of a plurality of utterances;
generate a first gate output, utilizing the first gate, by combining an encoding of a current utterance and global contextual information associated with the plurality of utterances, wherein the first gate output is generated independent from output from the second gate;
generate a second gate output, utilizing the second gate, by combining the encoding of the current utterance and the global contextual information associated with the plurality of utterances, wherein the second gate output is generated independent from output from the first gate; and
generate a hidden vector for the current utterance by combining the first gate output, the second gate output, and a hidden vector for a previous utterance.

12. The system of claim 11, wherein the one or more server devices are further configured to cause the system to generate, in parallel, hidden vectors for each of the plurality of utterances utilizing the independent gate context-dependent additive recurrent neural network.

13. The system of claim 12, wherein the one or more server devices are further configured to cause the system to generate a dialogue history vector by combining the hidden vectors for plurality of utterances.

14. The system of claim 13 wherein the one or more server devices are further configured to cause the system to generate a response to the plurality of utterances based on the dialogue history vector.

15. The system of claim 14, wherein the one or more server devices are further configured to cause the system to generate the response to the plurality of utterances by selecting the response from a plurality of candidate responses based on a distribution of the plurality of candidate responses conditioned on the dialogue history vector.

16. In a digital medium environment for providing end-to-end dialogue via a digital agent, a computer-implemented method comprising:
generating vector representations for one or more utterances received from a user;
determining global contextual information associated with the one or more utterances;
generating a dialogue history vector for the one or more utterances utilizing an independent-gate context-dependent additive recurrent neural network by generating for each utterance:
a first gate output, utilizing a first gate, by combining a vector representation of a current utterance and the global contextual information, wherein the first gate output is generated independent from output from a second gate;
a second gate output, utilizing the second gate, by combining the vector representation of the current utterance and the global contextual information, wherein the second gate output is generated independent from output from the first gate;
generating a dialogue history vector from the outputs of the first gate and the second gate; and
generating, based on the dialogue history vector, a dialogue response to the one or more utterances.

17. The method of claim 16, wherein generating the first gate output and the second gate output is performed without local contextual information.

18. The method of claim 17, wherein generating the first gate output and the second gate output for each utterance is done in parallel.

19. The method of claim 18, further comprising generating a hidden vector for each of the utterances by combining the first gate output and the second gate output for each utterance with a hidden vector for a previous utterance.

20. The method of claim 19, further comprising generating the dialogue history vector from the outputs of the first gate and the second gate by combining the hidden vectors.

* * * * *